June 28, 1966     G. O. DU PUY     3,258,676
REGULATED D.C. POWER SUPPLY
Filed Aug. 13, 1962
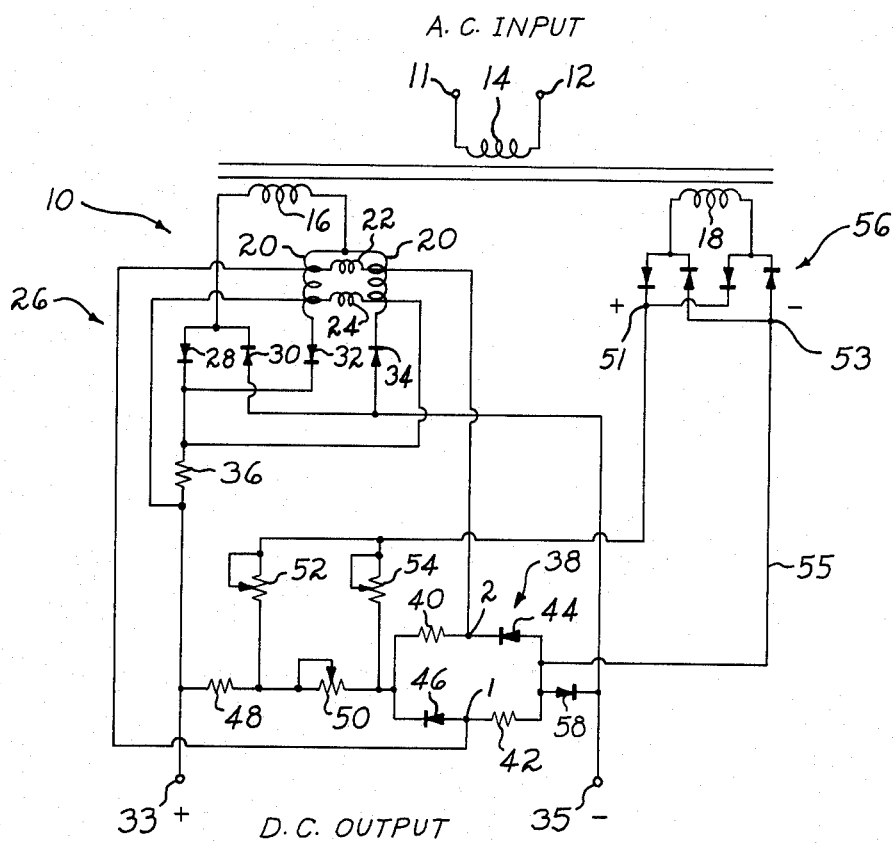
INVENTOR.
GLEN O. DuPuy
BY HIS ATTORNEYS
HARRIS, KIECH, RUSSELL & KERN United States Patent Office 3,258,676
Patented June 28, 1966

3,258,676
REGULATED D.C. POWER SUPPLY
Glen O. Du Puy, Los Angeles, Calif., assignor to Christie Electric Corp., Los Angeles, Calif., a corporation of California
Filed Aug. 13, 1962, Ser. No. 216,506
7 Claims. (Cl. 321—25)

This invention relates to a D.C. power supply for operation from an A.C. power source and, in particular, to a regulated power supply suitable for use in battery charging, operating motors, relays, other electrical equipment, and electrolysis processes and the like.

It is an object of the invention to provide a power supply which will have a substantially constant output voltage adjustable over a wide range, yet retaining a high regulation accuracy. Another object of the invention is to provide a power supply having a substantially constant output voltage and retaining a rapid response time for full load application and removal and line changes.

It is a further object of the invention to provide a constant voltage power supply having a control circuit which utilizes the substantially constant voltage characteristic of a zener element.

Another object of the invention is to provide a constant voltage power supply in which a control circuit is provided including a reference bridge comprising a combination of resistor elements and zener diodes connected across the output of the power supply.

It is another object of the invention to provide a constant voltage power supply incorporating a control circuit which utilizes the substantially constant voltage characteristic of a zener element connected across the output of the power supply by a resistor element used to establish the minimum adjustable output voltage and a variable resistor element employed to adjust the output voltage to a desired value.

It is a further object of the invention to provide a constant voltage power supply which compensates for a change in the applied load by including a current feedback line having a resistor element therein.

Another object of the invention is to provide a constant voltage power supply which compensates for input voltage variations by incorporating an A.C. voltage compensation factor as a function of the D.C. voltage setting in a manner that is accurate over the entire range of D.C. output voltage.

It is another object of the invention to provide a constant voltage power supply including a control circuit having a reference bridge comprising a combination of resistor elements and zener diodes and connected across the output of the power supply by a resistor element used to establish the minimum adjustable output voltage and a variable resistor element employed to adjust the output voltage to a desired value, and incorporating an A.C. voltage compensation factor which is obtained through a variable resistor network connected in series across the variable resistor element.

It is another object of this invention to provide a constant voltage power supply including an A.C. power source; a saturable reactor means having a power winding, a first control winding, and a second control winding; a rectifier unit; a pair of load terminals; circuit means interconnecting said power source, said power winding, and said rectifier unit to provide a D.C. output voltage across said load terminals, with a current varying as a function of the D.C. output current passing through said second control winding in a current feedback relation; means for developing a correction voltage varying as a function of the A.C. power source; and a control circuit connected to said first control winding, said control circuit including a reference bridge comprising a combination of resistor elements and zener diodes, and a resistor network connected in series with said reference bridge across the D.C. output, with at least a portion of said correction voltage adding with said output voltage to provide a control current for said first control winding.

The invention also comprises novel details of construction and novel combinations and arrangements of parts, which will more fully appear in the course of the following description. The drawing shows a circuit diagram of a preferred embodiment of the present invention which is given by way of illustration or example. While the embodiment illustrated and described herein is used with a single phase A.C. source, it should be understood that the invention is equally suitable for use with multiple-phase sources.

The apparatus of the invention as illustrated herein comprises a regulated D.C. power supply 10 with the A.C. power supplied through terminals 11, 12 of primary winding 14 of a transformer having secondary windings 16 and 18.

The regulated D.C. power supply 10 includes an A.C. to D.C. converter for developing a D.C. voltage across an output load and having control elements for varying the magnitude of this output voltage. In the preferred embodiment of the invention illustrated herein, the converter includes a saturable reactor having a dual power winding 20, a first control winding 22, a second control winding in the nature of a current feedback winding 24, and a rectifier unit 26 having rectifiers 28, 30, 32, and 34. The reactor and the rectifier unit are connected to the secondary winding 16 in a single phase, rectifier bridge circuit to provide a D.C. output at terminals 33, 35. Of course, other conventional rectifier circuits may be substituted. It is preferred to provide a positive current feedback circuit in the reactor which includes the resistor 36 connected in series in an output line and control winding 24 connected across the resistor, for compensating in part for changes in the output voltage caused by variations in the load.

The control current passing through the control winding 22 is supplied by a reference bridge 38 comprising resistors 40, 42 and zener diodes 44, 46. Resistors 48 and 50 may be connected in series with the reference bridge 38. The resistor 48 is used to establish the minimum adjustable output voltage. The variable resistor 50 is employed to adjust the output voltage to the desired value within the limits of the characteristics of the components utilized. Further, the magnitudes of the voltages so connected are dependent upon the parameters of the individual components and may be varied to provide the particular output desired.

The output voltage generated at the terminals 33, 35 provides a signal varying as a function of the output voltage and establishes a current in the reference bridge 38 of a magnitude as to make point 1 of the reference bridge positive with respect to point 2 thereof under static conditions developing a bridge output across the control winding 22. When the output voltage tends to increase owing to an increase of A.C. input voltage or decrease in load, the control current in the winding 22 will be increased, thereby maintaining the output voltage at a substantially constant level.

The zener diodes 44 and 46 will normally be operated in their breakdown region. In this area of operation a zener element has a sharp kneed current-voltage characteristic providing a large current or impedance change for a relatively small change in applied voltage. However, it is to be noted that the instant circuit could be operated with conventional diodes or nonlinear resistors in place of the zener diodes.

Improved performance may be obtained by providing an additional signal source for the reference bridge. In addition to the compensation afforded by the load current feedback winding 24, the instant device provides an additional compensating means which operates as a function of both the A.C. input voltage and the D.C. output voltage.

A signal varying as a function of the A.C. source voltage is combined across the bridge 38 with the signal varying as a function of the D.C. load voltage. The A.C. source voltage signal is developed at points 51, 53 by the secondary winding 18 and a rectifier unit 56 and is connected to the input of the bridge 38 through variable resistors 52, 54 and line 55. When the circuit is to be operated at a fixed output voltage only one of the variable resistors 52 and 54 need be used. By adjustment of the variable resistors 50, 52, 54 accurate compensation can be obtained at any desired voltage setting. The resistor 50 provides the primary control for setting the load voltage. The resistor 52 provides adjustment for the A.C. line compensation at minimum D.C. output voltage. The resistor 54 provides adjustment for the A.C. line compensation at maximum D.C. voltage.

In certain instances a rectifier diode 58 can be introduced between the reference bridge 38 and the load terminal 35 of the power supply output to block any parallel path for current from the rectifier unit 56 through the external load.

Although an exemplary embodiment of the invention has been disclosed and discussed, it will be understood that other applications of the invention are possible and that the embodiment disclosed may be subjected to various changes, modifications and substitutions without departing from the spirit of the invention.

I claim as my invention:

1. In a regulated D.C. power supply for operation from an A.C. power source, the combination of:
   saturable reactor means having a power winding and a control winding;
   a rectifier unit;
   a pair of load terminals;
   circuit means interconnecting said power source, said power winding and said rectifier unit to provide a D.C. output voltage across said load terminals;
   means for developing a correction signal varying as a function of the A.C. source voltage; and
   a control circuit connected to said control winding, said control circuit including a reference bridge comprising at least a pair of resistor elements and at least a pair of zener elements, circuit means for connecting the bridge input across said load terminals, circuit means for connecting said correction signal to said bridge input, and circuit means for connecting the bridge output to said control winding to provide a control current for said control winding.

2. In a regulated D.C. power supply for operation from an A.C. power source, the combination of:
   saturable reactor means having a power winding, a first control winding, and a second control winding;
   a rectifier unit;
   a pair of load terminals;
   circuit means interconnecting said power source, said power winding, and said rectifier unit to provide a D.C. output voltage across said load terminals;
   means for connecting a current varying as a function of the D.C. load current to said second control winding in a current feedback relation;
   means for developing a correction signal varying as a function of the A.C. source voltage; and
   a control circuit connected to said first control winding, said control circuit including a reference bridge comprising at least a pair of resistor elements and at least a pair of zener elements, circuit means for connecting the bridge input across said load terminals, circuit means for connecting said correction signal to said bridge input, and circuit means for connecting the bridge output to said control winding to provide a control current for said first control winding.

3. In a regulated D.C. power supply for operation from an A.C. power source, the combination of:
   saturable reactor means having a power winding and a control winding;
   a first rectifier unit;
   a pair of load terminals;
   circuit means interconnecting said power source, said power winding and said first rectifier unit to provide a D.C. output voltage across said load terminals;
   a control circuit connected to said control winding, said control circuit including a reference bridge comprising at least a pair of resistor elements and at least a pair of zener elements, a first resistor, and a second variable resistor connected in series across the D.C. load terminals; and
   means for developing a correction signal varying as a function of the A.C. source voltage including a second rectifier unit, means for energizing said second rectifier unit from said A.C. source, and means for connecting the output of said second rectifier unit across said reference bridge.

4. In a regulated D.C. power supply for operation from an A.C. power source, the combination of:
   saturable reactor means having a power winding and a control winding;
   a first rectifier unit;
   a pair of load terminals;
   circuit means interconnecting said power source, said power winding and said first rectifier unit to provide a D.C. output voltage across said load terminals;
   a control circuit connected to said control winding, said control circuit including a reference bridge comprising at least a pair of resistor elements and at least a pair of zener elements, a first resistor, and a second variable resistor connected in series across the D.C. load terminals;
   means for developing a correction signal varying as a function of the A.C. source voltage including a second rectifier unit, means for energizing said second rectifier unit from said A.C. source, and means for connecting the output of said second rectifier unit across said reference bridge; and
   third and fourth variable resistors connected in series across said second variable resistor, and means for connecting the output of said second rectifier unit to the junction of said third and fourth resistors and to said reference bridge.

5. In a regulated D.C. power supply for operation from an A.C. power source, the combination of:
   saturable reactor means having a power winding, a first control winding, and a second control winding;
   a first rectifier unit;
   a pair of load terminals;
   circuit means interconnecting said power source, said power winding, and said first rectifier unit to provide a D.C. output voltage across said load terminals;
   a current feedback resistor connected in circuit between a load terminal and said first rectifier unit, with said second control winding connected across said resistor;
   a control circuit connected to said first control winding, said control circuit including a reference bridge comprising at least a pair of resistor elements and at least a pair of zener elements, a first resistor, and a second variable resistor connected in series across the D.C. load terminals;
   means for developing a correction signal varying as a function of the A.C. source voltage including a second rectifier unit, means for energizing said second rectifier unit from said A.C. source, and means for connecting the output of said second rectifier unit across said reference bridge; and
   third and fourth variable resistors connected in series across said second variable resistor, and means for connecting the output of said second rectifier unit to the junction of said third and fourth resistors and to said reference bridge.

6. A regulated D.C. power supply as set forth in claim 5, including a rectifier connected between said reference bridge and a load terminal polarized to block correction signal current from the load.

7. In a regulated D.C. power supply for operation from an A.C. power source, the combination of:

saturable reactor means having a power winding, a first control winding, and a second control winding;
a first rectifier unit;
a pair of load terminals;
circuit means interconnecting said power source, said power winding, and said first rectifier unit to provide a D.C. output voltage across said load terminals;
a current feedback resistor connected in circuit between one of said load terminals and said first rectifier unit, with said second control winding connected across said resistor;
a control circuit connected to said first control winding, said control circuit including a reference bridge comprising a combination of resistor elements and zener elements, a first resistor, and a second variable resistor with said bridge and first and second resistors connected in series across the said load terminals; and
means for developing a correction signal varying as a function of the A.C. voltage source and including a second rectifier unit, means for energizing said second rectifier unit from said A.C. power source, and means for connecting the output of said second rectifier unit across said reference bridge including at least a third variable resistor.

References Cited by the Examiner
UNITED STATES PATENTS

| | | | |
|---|---|---|---|
| 2,721,304 | 10/1955 | Silver et al. | 321—25 X |
| 3,005,145 | 10/1961 | McNamee | 321—25 X |
| 3,037,159 | 5/1962 | Brown | 321—25 X |

LLOYD McCOLLUM, *Primary Examiner.*

J. M. THOMSON, W. E. RAY, *Assistant Examiners.*